US006518356B1

(12) United States Patent
Friese et al.

(10) Patent No.: US 6,518,356 B1
(45) Date of Patent: Feb. 11, 2003

(54) FUNCTIONAL DYES USED AS AN INDICATOR IN AEROBICALLY HARDENING COMPOSITIONS

(75) Inventors: Carsten Friese, Hamburg (DE); Georg Knuebel, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/555,160

(22) PCT Filed: Nov. 16, 1998

(86) PCT No.: PCT/EP98/07303

§ 371 (c)(1),
(2), (4) Date: Jul. 24, 2000

(87) PCT Pub. No.: WO99/27027

PCT Pub. Date: Jun. 3, 1999

(30) Foreign Application Priority Data

Nov. 24, 1997 (DE) .......................................... 197 51 953

(51) Int. Cl.$^7$ ............................ C08L 69/00; C08L 75/00
(52) U.S. Cl. ...................... 524/580; 524/583; 523/160; 523/303; 428/343; 428/344; 428/355 AC; 428/355 N; 381/150; 435/808
(58) Field of Search ................................ 524/853, 850; 523/160, 303; 428/343, 344, 355 AC, 355 N; 525/51, 328.4; 381/150; 435/808

(56) References Cited

U.S. PATENT DOCUMENTS

| | | | |
|---|---|---|---|
| 3,390,121 A | 6/1968 | Burford et al. | ................ 260/40 |
| 4,010,152 A | 3/1977 | MacLeady et al. | ......... 260/192 |
| 4,164,492 A | 8/1979 | Copper | ..................... 260/40 R |
| 4,478,942 A | * 10/1984 | Katsuyama et al. | |
| 5,183,969 A | 2/1993 | Odashima | ................. 174/88 R |
| 5,371,122 A | * 12/1994 | Kawahara et al. | ............. 524/88 |
| 5,434,230 A | 7/1995 | Huver et al. | ............. 526/219.2 |
| 5,567,753 A | 10/1996 | Shuman et al. | ............. 524/249 |
| 5,852,126 A | * 12/1998 | Barnard et al. | .......... 525/326.3 |

FOREIGN PATENT DOCUMENTS

| | | |
|---|---|---|
| DE | 40 00 776 | 7/1991 |
| DE | 40 01 417 | 7/1991 |
| DE | 41 32 726 | 4/1992 |
| DE | 41 12 649 | 10/1992 |
| DE | 41 23 194 | 1/1993 |
| DE | 44 41 414 | 6/1995 |
| EP | 0 079 703 | 5/1983 |
| EP | 0 096 500 | 12/1983 |
| EP | 0342965 | 11/1989 |
| SU | 1386624 A | * 7/1988 |
| WO | WO91/10687 | 7/1991 |
| WO | WO98/34980 | 8/1998 |

OTHER PUBLICATIONS

Ullman Encyclopedia, 4th Edition, vol. 23, pp. 421–424 Date Unknown.
W.Kern Makromol.Chem.1, (1947) pp. 249–267 Month Unknown.
C. Sma, Agnew, Makromol Chem.9, (1969) pp. 165–181 Month Unknown.
Houben Weyl Methoden der Organischer Chmie, vol. 14/1 pp. 263–297 Month Unknown.

* cited by examiner

*Primary Examiner*—Margaret Medley
(74) *Attorney, Agent, or Firm*—Stephen D. Harper; Arthur G. Seifert

(57) ABSTRACT

The invention relates to the addition of dyes to aerobically curable adhesive compositions based on free-radically polymerizable compounds. The dyes serve as user-friendly indicators for monitoring the oxygen intake required to trigger the polymerization. The indicator dyes are especially suitable for aerobically adhesive compositions which contain activator systems for forming peroxides upon contact with air. Suitable dyes and indicators are those whose color change in aqueous solution lies within a pH range from 3.0 to 6.5.

28 Claims, No Drawings

FUNCTIONAL DYES USED AS AN INDICATOR IN AEROBICALLY HARDENING COMPOSITIONS

The present invention relates to an aerobically curing reactive adhesive composition and to its preparation and use.

Adhesive bonds are encountered in the domestic appliance, electrical, electronics, furniture, sports goods, construction (interior and exterior), ceramics and automotive industries, including their supplier operations. The mechanical engineering sector profits from the adhesive properties in the same way as does valve or installation engineering, where additionally there are sealing functions to be undertaken. In addition to same-kind material combinations of steel, aluminum, brass, copper, coated metal surfaces, wood, glass, PVC, PC (polycarbonate), and ABS, pairings of different materials are of particular importance from the standpoint of adhesives technology. In the case of these composite bonds, differences in thermal expansion behavior, or loss of adhesion, which occurs inter alia on materials such as ferrite or ceramic, often mean that the performance limit of known adhesive systems is reached. In certain applications, the adhesives are further required to possess damping properties, and/or in the case of different electrochemical potentials must not have any corrosion-promoting properties.

Known adhesive systems such as 2-part epoxy resins, cyanoacrylates, dispersion adhesives, contact adhesives, 2-part acrylate adhesives, 2-part poly-urethane adhesives or anaerobically curing adhesives are known to have performance limits in terms of gap-filling capacity, elasticity, automatic metering, heat stability, volatility, and aging.

Furthermore, for the bonding of a very wide variety of materials in the context of automated industrial manufacture, the demand is predominantly for short cycle times. Aerobically curable adhesives, as are known, for example, from DE-A-4000776 or DE-A-4123194, meet many of the abovementioned requirements. As is known, aerobically curable adhesive compositions are free-radically polymerizable multi-substance mixtures which are stable on storage to the exclusion of air, especially to the exclusion of oxygen. Furthermore, these compositions are required to contain no peroxides. For this purpose, as is known, these compositions are thoroughly degassed, and/or a deoxygenator is added to them. This enables a controlled initiation of polymerization: for example, adhesives and sealing, coating and molding compounds are initially stable on storage for a period of several months, which is sufficient for practical purposes, and then cure simply within a short time even at room temperature when air is admitted. Activation of the aerobic adhesive requires waiting times, before or after joining, during which the oxygen of the air must have access to the adhesive composition. For automatic industrial manufacture with its short cycle times, DE-A-4441414 proposes apparatus and measures for the metering and storage of aerobic adhesives. According to the teaching of the document, the time between application of the adhesive and joining of the parts to be connected may also be reduced by adding the oxygen to the adhesive even before the latter is applied. To this end, the application device comprises a mixing chamber in which the oxygen—whether in pure form or as air—is added to the adhesive under greater or lesser pressure.

For activation, one-component aerobically curing reactive adhesives require a certain time in order to take up atmospheric oxygen (air contact time). The air contact time required is dependent on the additives and stabilizers used in the adhesive composition, on temperature and on other parameters, so that for the user it is first necessary to determine the particular optimum air contact time by means of experiments. For unproblematic and low-error application of such adhesives, therefore, there is a need to be able to determine, simply, the sufficient uptake of oxygen by the aerobically curable composition.

The solution provided by the invention to this problem is given in the claims. It consists essentially in the provision of aerobically curable compositions which are based on free-radically polymerizable compounds and comprise an activator system for forming peroxides and a dye as an indicator of sufficient oxygen uptake. Furthermore, the aerobically curing compositions of the invention may comprise further customary additives.

The addition of dyes to adhesive compositions for the purpose of monitoring the degree of curing is already known. For instance, EP-A-342965 describes an adhesive composition comprising a one-component heat-curing adhesive and an effective fraction of a water-insoluble indicator which does not react with the components of the adhesive at room temperature but which on heat curing produces a color change to enable a visible determination of the state of cure of the adhesive.

EP-A-79703 describes a two-component adhesive composition whose first component comprises a vinyl monomer and a polymerization initiator and whose second component comprises a polymerization accelerator, and additionally a redox indicator having an $E_o$ of greater than +0.01 to less than +0.76 volt and an $R_H$ of from 13.5 to 28. According to the teaching of this document, the dye serves to indicate the time from which the mixture of the two-component adhesive composition, after mixing, should no longer be used (end of pot life). This dye further serves to distinguish the two reactive components and to ascertain the completeness of mixing.

DE-A-4001417 describes a toughened two-component epoxy resin adhesive based on an epoxy resin and on an amine hardener, the resin component comprising a color indicator which indicates the homogenous mixing of resin and hardener by means of a change in color.

DE-A-4132726 and DE-A-4112649 describe adhesive systems based on epoxy resins to which a color or, respectively, a color pigment is admixed which changes its color on curing, so making it possible to determine complete curing of the adhesive composition.

EP-A-96500 describes a two-component adhesive composition based on polymerizable vinyl monomers, free-radical stabilizers, and a free-radical curing system. When the two components are mixed a color change takes place which allows for complete mixing and represents a visible indicator of the limited pot life. Additionally, the curing process is accompanied by a color change.

None of the abovementioned documents discloses an indicator for the sufficient oxygen uptake of aerobically curable adhesive compositions.

The free-radically polymerizable compounds of the present invention comprise

A) at least one polyurethane (meth)acrylate of the general formula

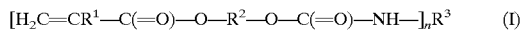

$$[H_2C=CR^1—C(=O)—O—R^2—O—C(=O)—NH—]_nR^3 \quad (I)$$

in which
$R^1$ = hydrogen or a methyl group
$R^2$ = a linear or branched alkyl group having 2 to 6 carbon atoms or alkylene oxides having 4 to 21 carbon atoms,
n = 2 or 3, and $R^3$ if n=2 is:

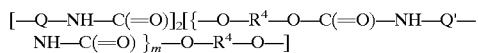

in which m=0 to 10, $R^4$ is
- a) a polycaprolactonediol radical,
- b) a polytetrahydrofurfuryldiol radical or
- c) a diol radical derived from a polyester diol characterized by a C:O ratio of >2.6, a C:H ratio of <10, and a molecular weight from 1000 to 20,000, or
- d) a diol radical derived from a polyester diol which is liquid at 20° C. and has a molecular weight of from 4000 to 10,000, measured with the aid of GPC (gel permeation chromatography), and $R^3$ if n=3 is:

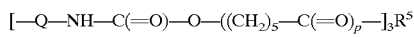

in which $R^5$ is a triol radical of a linear or branched trivalent alcohol containing 3 to 6 carbon atoms and p is from 1 to 10, and Q and Q', independently of one another, are aromatic, aliphatic or cycloaliphatic groups which contain 6 to 18 carbon atoms and are derived from diisocyanates or mixtures of diisocyanates, and also B) one or more (meth)acrylate comonomers, where said composition comprises 20–80% by weight of the polyurethane (meth)acrylate, and 80–20% by weight of the (meth)acrylate comonomer, based on the overall amount of polymerizable compounds, and the activator system is a hydrazone activator system.

The compounds of the above formula (I) can be prepared in accordance with processes known per se in the prior art by reacting an acrylate ($R^1$=H) or methacrylate ($R^1$=CH$_3$) containing hydroxyl groups in the ester group with compounds containing isocyanate groups, to form urethane groups.

In accordance with the invention, said acrylates or methacrylates comprise hydroxyalkyl acrylates or methacrylates, in which the alkyl groups may be linear or branched and contain between 2 and 6 carbon atoms. According to the invention, it is also possible to use the esters of acrylic acid or methacrylic acid with polyethylene glycol and/or polypropylene glycol. Such acrylates or methacrylates contain 4 to 21 carbon atoms in the ester group, corresponding to from 2 to 10 ethylene oxide units and from 1 to 7 propylene oxide units. The preparation of such esters is known to the skilled worker.

Suitable acrylates or methacrylates are those for which $R^2$ contains an ethylene, propylene, isopropylene, n-butylene or isobutylene group or ethylene oxide or propylene oxide units.

For the reaction of the isocyanates with the hydroxyl-bearing acrylates or methacrylates, however, preference is given to hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate, and polypropylene glycol methacrylate.

Where n=2, the compounds of the above general formula (I) are reaction products of the abovementioned hydroxyl-containing acrylates or methacrylates with isocyanates obtainable by reacting appropriate diols with diisocyanates. Said diols comprise a) polycaprolactonediols, b) polytetrahydrofurfuryldiols, and c) specific polyesterdiols. The molar ratio in the reaction of the diols with the diisocyanates may vary from 1:2 to 1:1.1.

For further details, especially as regards the detailed structure of the compounds of the general formula (I) and of the diols used in accordance with a), b) and c), reference is made to DE-A-4441414 page 3 lines to 60 to page 5 line 5, which are expressly part of the present invention.

The adhesive composition may further comprise one or more acrylate or methacrylate comonomers. These monomers are selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzoyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert-butyl methacrylate, and tetrahydrofurfuryl methacrylate, or mixtures thereof. It is also possible to use dimethacrylates, such as especially TEGDMA (tetraethylene glycol dimethacrylate).

The composition of the invention preferably contains from 20 to 70% by weight of the polyurethane (meth)acrylate and from 80 to 30% by weight of the (meth)acrylate comonomer, based on the overall amount of polymerizable compounds.

The adhesive compositions of the invention are used as free-radically polymerizable one-component systems. In each case, however, an initiator or activator system is used which triggers the polymerization of olefinically unsaturated systems. A feature of such activators is the capacity to be activated by the ingress of ambient air, this activation being intended—in preferred embodiments—to ensue even at room temperature. Activator systems of this kind consist in general of an initiator component and an accelerator component.

One-component adhesive systems should be stable on storage, shapeable in their application form, in particular paste-like to fluid, and should have a pot life sufficient for processing but should then cure to a dimensionally stable form by the simple action of ambient air. The one-component adhesive systems must be kept protected from the ingress of air up until the time they are used.

For the purposes of the invention, hydrazones have been used as initiators or main components in activator systems for the curing of the unsaturated compounds by means of ambient air. For acceleration, the hydrazone compounds are preferably used with metal compounds at least partially soluble in the system.

The hydrazone components used with preference in accordance with the invention are of the following general formula II

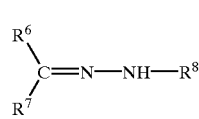

(II)

The radicals $R^6$, $R^7$ and $R^8$ from this general formula (II) have the following meanings:

$R^6$ is a straight-chain, branched or cyclic and optionally substituted alkyl radical or an optionally substituted aryl radical.

The definition of $R^7$ can be the same as or different than that of the radical $R^6$, $R^7$ being hydrogen, a straight-chain, branched or cyclic and substituted alkyl radical, or an optionally substituted aryl radical.

In one particular embodiment, the radicals $R^6$ and $R^7$, together with the shared substituted carbon atom, may also form a cycloaliphatic radical, which may also be substituted.

The radical $R^8$ is again a branched, straight-chain or cyclic and optionally substituted alkyl radical or an optionally substituted aryl radical.

The radicals $R^6$, $R^7$ and $R^8$ may all, or at least in part, be the same; however, each of these radicals may also differ in its structure from the two other radicals. Suitable alkyl radicals are especially straight-chain and/or branched alkyl radicals having up to 40 carbon atoms, preferably up to about 20 carbon atoms. The minimum carbon number of cyclic radicals is determined by the stability of the respective ring system. A preferred lower limit in this respect is 5 and, in particular, 6 carbon atoms.

The radicals $R^6$, $R^7$ and $R^8$ may be unsubstituted or substituted. It should be borne in mind here that by substituting these radicals, and especially the radical $R^8$, it is possible to exert a certain influence over the reactivity of the activator system. If, for example, an aromatic system, especially a phenyl radical, is present as the radical $R^8$, then by appropriate substitution of this phenyl radical it is possible to accelerate the reaction by providing known electron donating substituents on this phenyl radical in $R^8$. Electron donating and thus reaction accelerating substituents are, for example, alkyl, alkoxy and/or halogen substituents on the phenyl radical in $R^8$; conversely, strongly electron withdrawing substituents, of the type of the $-NO_2$ group, have a retarding effect on the progress of reaction. In relation to such electron donating and electron withdrawing effects by substitution, and on the structure of the respective substituents, there exists extensive general technical knowledge, to which reference is made here.

The radicals $R^6$ and $R^7$ from the general formula II may also act to influence the rates of the progress of the reaction, through the choice of their respective constitution and of any substitution provided.

In relation to the extraordinary diversity of the particular nature of the radicals $R^6$, $R^7$ and $R^8$ from the compounds of the general formula II, information is given by U.S. Pat. No. 4,010,152 with its formulae from columns 6 to 14. The hydrazone compounds are shown here already in the form of their hydroperoxides, as are also formed in accordance with the invention, in situ on the ingress of atmospheric oxygen in the course of the reaction. The extensive details of this last-mentioned document in relation to the particular nature of the hydrazone compounds and on the hydroperoxides formed from them in situ apply to the teaching of the invention in connection with the definition of the compounds of the general formula II.

Specific examples of hydrazones to be used are acetophenone methylhydrazone ($R^6$=phenyl, $R^7$=$R^8$=$CH_3$) and acetophenone t-butylhydrazone ($R^6$=phenyl, $R^7$=$CH_3$, $R^8$=$C(CH_3)_3$).

For further details regarding the preparation and mode of action of the hydrazones, reference is made to WO-A-91/10687.

In addition, a proportion of soluble metal compounds may be present in the system.

In this context, metal compounds employed are in particular those of metals able to exist in a plurality of valence states (dryers). Selected representatives of the transition metals may be particularly active here. Irrespective selection of the metal may inter alia be accorded a rate-determining character in relation to initiating polymerization. Components highly active at room temperature are derived, for example, from copper, cobalt, vanadium and/or manganese. Compounds of iron, however, are accorded particular significance and good acceleration of the action.

Compounds suitable for operating at room temperature, which is particularly advantageous for many fields of application, are especially iron, cobalt and/or manganese compounds, alone or in a blend with further metallic components such as compounds of lead, cerium, calcium, barium, zinc and/or zirconium. Reference may be made here to the relevant technical literature. A comprehensive representation of such systems can be found, for example, in "Ullmann, Enzyklopädie der technischen Chemie", 4th edition, Volume 23 (1983), pages 421 to 424.

The metals concerned here are used in the form of compounds such that they are at least partially soluble in the overall system. Suitable types in this context include not only soaplike metal compounds but also other forms, especially those attached in complex form to organic radicals. Typical examples for operating in accordance with the invention include the use of corresponding metal naphthenates and/or metal acetylacetonates. Where the solubility of inorganic salts in the system is sufficient, however, the use of inorganic systems of this kind is also possible. One typical example of this is iron chloride, which when used in the system of the invention exhibits a markedly accelerating action.

It may be judicious to use the metal compounds in each case in a low valence state of the metal—i.e., for example, as cobalt(II) or manganese(II). In other cases it is also suitable to use the metal compound in the higher valence state of the metal. For example, iron may also be used in the form of the $Fe^{3+}$ compounds.

Additionally, the compositions of the invention may comprise reducing agents having an accelerator effect, as are used in customary redox systems for initiating polymerization. Reference is made to the relevant extensive literature, examples being W. Kern, makromol. Chem. 1, 249 (1947), and C. Sma, Angew. Makromol. Chem. 9, 165 (1969), and also to the general technical knowledge, as described, for example, in Houben Weyl "Methoden der organischen Chemie" Volume 14/1, 263 to 297.

A class of compound which has been found particularly active here is that of the alpha-hydroxy ketones, represented for example by butyroin, benzoin or acetoin, although the teaching of the invention is by no means restricted thereto. Reference is made to the modifications shown in the examples of the invention. The essential point is that, although this class of substance is able to undertake an important reaction-accelerating function in the activated systems used in accordance with the invention, its use is, however, not mandatory.

Initiators or activator systems comprising the principal components depicted here—hydrazone compound, at least partially soluble metallic dryer and/or, if desired, additional accelerator—are able, following uptake of ambient air, to initiate all of the free-radically polymerizable, olefinically unsaturated systems used to date with the most diverse initiator systems, especially peroxidic initiator systems. Regarding definition of the further constituents of the shapeable, free-radically polymerizable multi-substance mixtures described in accordance with the invention it is possible to this extent to refer to the extensive information in the relevant literature dealing with the preparation and processing of the systems based on olefinically unsaturated, free-radically polymerizable compounds. In the art today there is an extremely large number of systems of substances of this nature which are tailored in terms of their properties to the particular end use. Olefinically unsaturated reactive systems may be based on selected free-radically polymerizable, ethylenically unsaturated compounds, or on mixtures of two or more types of such compounds. These ethylenically unsaturated polymerizable components may be monofunctional compounds and/or poly-functional reactive components.

As an indicator of sufficient oxygen uptake by the aerobically curable compositions of the invention, use is made of dyes which are known per se. The selection criterion for these dyes is a clearly visible color change, which must correlate with the sufficient uptake of oxygen by the adhesive composition. Color change is understood to mean the development of a color which differs from the original state, or an increase or decrease in the intensity of the original color. Furthermore, the addition of the dyes in the concentration ranges intended for use must not adversely affect the physical properties of the curable system or its setting properties.

Leuco dyes such as leuco crystal violet and leuco malachite green are sensitive to oxidation and exhibit a marked color change after oxidation. Although investigations of these leuco dyes in the adhesive compositions of the invention did show an alteration in color as a function of the period of contact with the air, this alteration in color did not correlate with the degree of polymerization.

In accordance with the invention, suitable dyes and indicators are those whose color change in aqueous solution lies within a pH range from 3.0 to 6.5. Specific examples of such dyes are bromophenol blue, bromochlorophenol blue, bromocresol green, 5-nitro-indazolinone, alizarin S, methyl red and ethyl red. The amount of the dyes to be used depends on the end use and on the inherent color of the adhesive composition without the dye. In each specific case it can be determined simply by means of expert considerations and/or by means of preliminary experiments. In very general terms, the weight fraction of dyes is not more than 5% by weight, preferably from 0.01 to 2% by weight based on the overall composition.

The purity of the composition for the target polymerization, in particular for storage, is accorded particular importance. In accordance with the invention, the oxygen may be removed by devolatilization. For this purpose, preferably, the homogenized composition minus the hydrazone is exposed to a vacuum of 0.5 torr at approximately −196° C. for from 2 to 5 minutes and is then warmed to room temperature. Repeating this freeze/thaw cycle several times removes residual oxygen from the system. A simple and practical measure is to store the composition at 80° C. in the absence of air. No polymerization must have occurred after 24 hours. Devolatilization can also be carried out by other means; for example, with the aid of ultrasound, or chemically.

It is known that olefins and other unsaturated compounds, especially polymerizable monomers, must be stabilized for the purpose of their storage. The procedure in this case starts from the following basic types of reaction:

1. stabilization to $O_2$ by adding antioxidants, and
2. stabilization to free radicals by adding free-radical inhibitors.

From the general chemical knowledge, a listing may be given below of typical stabilizer components, the mechanism to which the stabilizer is to be assigned being indicated in brackets after the specific compound in each case: pyrogallol (1), $O_2$-inhibited acrylates (1), hydroquinone (1,2), hydroquinone monomethyl ether (1,2), butylated hydroxytoluene (2), and phenothiazine (2). Of particular importance for stabilizing the system against unwanted premature reaction are deoxygenators of the triphenylphosphine type, and also iodide-iodine solutions. The amount thereof depends on the end use. In each specific case it can be determined simply by means of expert considerations and/or by means of preliminary experiments. In very general terms, the weight fraction of stabilizers is not more than 5% by weight, preferably from 0.01 to 1% by weight, based on the overall composition. Too high an amount retards the desired polymerization on ingress of air.

The compositions of the invention are preferably used as aerobically curing sealing materials or adhesives but may also be used as a spreadable composition for surface coatings, as a molding compound, or as an additive to inks, including printing inks. For this purpose it may be necessary to use not only the constituents already mentioned but also soluble and/or insoluble fillers, elasticizers, thickeners, thixotropic agents, pigments, adhesion promoters and the like, without threatening the ability of the initiator system of the invention to function. The precondition for this is, of course, that the selection of auxiliaries and fillers rules out disruptions to the interaction of the initiator components. In this respect, general chemical knowledge applies.

The compositions of the invention contain (based on the overall composition):

at least 20, preferably at least 40% by weight of free-radically polymerizable compounds having an olefinically unsaturated double bond, at least 0.1, preferably from 0.5 to 7.5 and, in particular, from 1 to 4% by weight of a hydrazone compound, from 0 to 5, preferably from 0.01 to 1% by weight of stabilizer, from 0 to 5, preferably from 0.005 to 1 and, in particular, from 0.1 to 0.5% by weight of a metal compound, from 0 to 80, preferably from 10 to 50% by weight of auxiliaries depending on the use of the composition, e.g., fillers, pigments, thickeners, adhesion promoters, and elasticizers, and also from 0.01 to 5% by weight of an indicator dye.

The examples which follow serve as specific elucidation of preferred embodiments of the invention, the selection of the examples not being intended to constitute any restriction on the scope of the subject matter of the invention.

EXAMPLES

An aerobic adhesive composition was prepared from 40% by weight of benzyl methacrylate, 12% by weight of hydroxypropyl methacrylate and 48% by weight of polyurethane methacrylate comprising a polycaprolactone triol and a polycaprolactonediol, and also from toluene diisocyanate and hydroxypropyl methacrylate, preparation taking place as described in Example V 1) on page 10 of DE 44 41 414 A1. The adhesive composition likewise comprised the additions of acetophenone tert-butylhydrazone as initiator, as specified on page 11 of that document, and also further customary additives, in particular the abovementioned stabilizers.

50 mg of bromochlorophenol blue, as dye, were dissolved in 250 g of this adhesive composition.

The composition was investigated for its adhesive properties in the context of bonding to a wide variety of substrates (DIN 53281, 53282 and 53283). To this end, 5 drops of the adhesive composition (approximately 60 mg) were applied to one side of the substrate in question, and joining was carried out following an air contact time of 5 minutes. After this air contact time, a color change from yellowish orange (the original color of the adhesive composition) to green was observed.

The table below lists the strength values of the adhesive bond obtained, after the air contact time indicated above. These values are mean values determined from at least 5 measurements. "CF" denotes cohesive fracture in the adhesive joint, "MF" denotes material fracture of the substrate. The times indicated for storage refer to the storage time of the bonded substrates prior to the strength test in question.

| | Force [N] (mean) | Tensile shear strength [N/mm²] (mean) | Fracture | Through-curing |
|---|---|---|---|---|
| Alu.: sandblasted (after 72 h storage) | 4164 | 16.7 | CF | satis. |
| Standard deviation: | ±314.1 | ±1.3 | | |
| Steel: sandblasted (after 3 h 80° C. - storage) | 6582 | 26.3 | CF | satis. |
| Standard deviation: | ±136.0 | ±0.5 | | |
| Steel: sandblasted (after 72 h - storage) | 5734 | 22.9 | CF | satis. |
| Standard deviation: | ±405.1 | ±1.6 | | |
| Steel: sandblasted (after 72 h + 3 h 80° C. - storage) | 5878 | 23.5 | CF | satis. |
| Standard deviation: | ±306.4 | ±1.2 | | |
| ABS: smooth (after 72 h - storage) | 2390 | 9.6 | MF | |
| Standard deviation: | ±26.1 | ±0.1 | | |
| PVC: smooth (after 72 h - storage) | 2236 | 8.9 | MF | |
| Standard deviation: | ±507.3 | ±2.0 | | |
| PC: smooth (after 72 h - storage) | 2198 | 8.8 | MF | |
| Standard deviation: | ±583.4 | ±2.3 | | |
| Alu.: sandblasted (after 3 h 80° C. - storage) | 4574 | 18.3 | CF | satis. |
| Standard deviation: | ±171.7 | ±0.7 | | |
| Steel: sandblasted (after 3 h 80° C. - storage) | 5692 | 22.8 | CF | satis. |
| Standard deviation: | ±374.3 | ±1.5 | | |
| ABS: smooth (after 3 h 80° C. - storage) | 2254 | 9.0 | MF | |
| Standard deviation: | ±115.0 | ±0.5 | | |
| PVC: smooth (after 3 h 80° C. - storage) | 1596 | 6.4 | MF | |
| Standard deviation: | ±250.8 | ±1.0 | | |
| PC: Smooth (after 3 h 80° C. - storage) | 1854 | 7.4 | MF | |
| Standard deviation: | ±107.1 | ±0.4 | | |

From these experimental results it is clear that the color change correlates unambiguously with the required oxygen uptake of the aerobic adhesive.

Similarly, with the dyes bromophenol blue and 5-nitroindazolinone, there was an unambiguous correlation of the clearly visible color change with the required oxygen uptake of the aerobic adhesive composition.

What is claimed is:

1. An aerobically curable composition based on free-radically polymerizable compounds, which comprises an activator system for forming peroxides in situ upon contact with air or oxygen and a dye as an indicator of the uptake of oxygen whose color change in aqueous solution lies within a pH range from 3.0 to 6.5.

2. A composition as claimed in claim 1, wherein said free-radically polymerizable compounds comprise A) at least one polyurethane (meth)acrylate of the general formula $$[H_2C{=}CR^1{-}C({=}O){-}O{-}R^2{-}O{-}C({=}O){-}NH{-}]_n R^3 \quad (I)$$

in which
R¹=hydrogen or a methyl group
R²=a linear or branched alkyl group having 2 to 6 carbon atoms or alkylene oxides having 4 to 21 carbon atoms,
n=2 or 3, and
R³ if n=2 is:

$$[{-}Q{-}NH{-}C({=}O){-}]_2[\{{-}O{-}R^4{-}O{-}C({=}O){-}NH{-}Q'{-}NH{-}C({=}O)\}_m{-}O{-}R^4{-}O{-}]$$

in which m=0 to 10,
R⁴ is
  a) a polycaprolactonediol radical,
  b) a polytetrahydrofurfuryldiol radical or
  c) a diol radical derived from a polyester diol characterized by a C:O ratio of >2.6, a C:H ratio of <10, and a molecular weight from 1000 to 20,000, or
  d) a diol radical derived from a polyester-diol which is liquid at 20° C. and has a molecular weight of from 4000 to 10,000, measured with the aid of GPC (gel permeation chromatography), and
R³ if n=3 is:

$$[{-}Q{-}NH{-}C({=}O){-}O{-}((CH_2)_5{-}C({=}O))_p{-}]_3 R^5$$

in which R⁵ is a triol radical of a linear or branched trivalent alcohol containing 3 to 6 carbon atoms and p is from 1 to 10, and
Q and Q', independently of one another, are aromatic, aliphatic or cycloaliphatic groups which contain 6 to 18 carbon atoms and are derived from diisocyanates or mixtures of diisocyanates, and also B) one or more (meth)acrylate comonomers, wherein said composition comprises
  (a) 20–80% by weight of the polyurethane (meth)acrylate, and
  (b) 80–20% by weight of the (meth)acrylate comonomer, based on the overall amount of polymerizable compounds, and the activator system is a hydrazone activator system.

3. A composition according to claim 2, comprising
  (a) 20–70% by weight of the polyurethane (meth)acrylate and
  (b) 80–30% by weight of the (meth)acrylate comonomer, based in each case on the overall amount of polymerizable compounds.

4. A composition as claimed in claim 1, wherein R² is selected from ethylene, propylene, isopropylene, n-butylene or isobutylene, ethylene oxide or propylene oxide units.

5. A composition as claimed in claim 1, wherein Q and Q' independently of one another are derived from diisocyanates selected from 2,4-toluene diisocyanate, 2,6-toluene diisocyanate, 4,4'-diphenylmethane diisocyanate (MDI), 4,4'-dicyclohexyldiisocyanate, meta- and para-tetramethylxylene diisocyanate, 3-isocyanatomethyl-3,5,5-trimethylcyclohexyl isocyanate (isophorone diisocyanate), hexamethylene diisocyanate, 1,5-naphthylene diisocyanate, dianisidine diisocyanate, di(2-isocyanatoethyl)bicyclo[2.2.1]hept-5-ene-2,3-dicarboxylate, 2,2,4- and 2,4,4-trimethylhexamethylene diisocyanate, and mixtures thereof.

6. A composition as claimed in claim 1, wherein the (meth)acrylate comonomer (B) is selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzoyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert-butyl methacrylate, and tetrahydrofurfuryl methacrylate, or mixtures thereof, and also dimethacrylate.

7. A composition as claimed in claim 1, wherein the activator system comprises hydrazone compounds of the general formula (II)

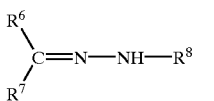
(II)

in which the radicals $R^6$, $R^7$ and $R^8$ are at least partially identical or different and have the following meanings:

$R^6$ is a straight-chain, branched or cyclic and optionally substituted alkyl radical or an optionally substituted aryl radical, $R^7$ is hydrogen, a straight-chain, branched or cyclic and optionally substituted alkyl radical, or an optionally substituted aryl radical, or $R^6$ and $R^7$, together with the shared substituted carbon atom, to form a cycloaliphatic radical, which may also be substituted;

$R^8$ is a straight-chain, branched or cyclic and optionally substituted alkyl radical or an optionally substituted aryl radical.

8. A composition as claimed in claim 7, further comprising metal compounds at least partially soluble in the system, wherein said metals are selected form a group consisting of iron, copper, cobalt and manganese.

9. A composition as claimed in claim 7, further comprising co-components with reduction potential from redox systems which initiate free-radical polymerizations are used as accelerators.

10. A composition as claimed in claim 7, wherein the components of the activator system are used in the following concentrations by weight, based in each case on the overall mixture:
(a) hydrazone compounds, from 0.1% to 7.5%,
(b) metal compounds, from 50 ppm to 1%;
(d) reducing agents, from 1 to 5%.

11. A composition as claimed in claim 7, wherein alpha-hydroxy ketones are used as reducing agents having an accelerator action.

12. A composition as claimed in claim 1, wherein the dye color change takes place from colorless/yellowish to red/blue, green or to the complementary colors of red, blue, green, and yellow.

13. A composition as claimed in claim 1, wherein said dye is selected from the group consisting of 5-nitroindazolinone, bromophenol blue, bromochlorophenol blue, bromocresol green, alizarin S, methyl red, and ethyl red.

14. A composition as claimed in claim 1 in spreadable form.

15. A method for determining the sufficiency of oxygen uptake in the adhesive bonding of materials with an aerobically curing reactive adhesive composition, said method comprising
(a) applying to at least one of the surfaces of the materials that are to be connected to one another an aerobically curable adhesive composition, said adhesive composition comprising
(i) at least one free-radically polymerizable compound,
(ii) an activator system for forming peroxides upon contact with air or oxygen, and
(iii) a dye as an indicator of the uptake of oxygen whose color change in aqueous solution lies within a pH range from 3.0 to 6.5;
(b) heating the materials on the surface provided with the adhesive composition to a temperature of 20–80° C. during the contact of the adhesive composition in the presence of atmospheric oxygen
(c) monitoring the uptake of oxygen by monitoring the color of the dye indicator of the heated adhesive composition,
(d) after the heated adhesive composition has taken up a sufficient amount of oxygen, as indicated by the appropriate color change of the dye indicator, joining the materials to one another at the desired surfaces, and
(e) curing the adhesive composition.

16. A method as claimed in claim 15, wherein the dye indicator color change takes place from colorless/yellowish to red/blue, green or to the complementary colors of red, blue, green, and yellow.

17. A method as claimed in claim 15, wherein said dye is selected from the group consisting of 5-nitroindazolinone, bromophenol blue, bromochlorophenol blue, bromocresol green, alizarin S, methyl red, and ethyl red.

18. A method according to claim 15, wherein said free-radically polymerizable compounds comprise
A) at least one polyurethane (meth)acrylate of the general formula

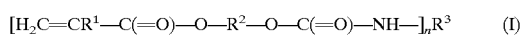
(I)

in which
$R^1$=hydrogen or a methyl group
$R^2$=a linear or branched alkyl group having 2 to 6 carbon atoms or alkylene oxides having 4 to 21 carbon atoms,
n=2 or 3, and
$R^3$ if n=2 is:

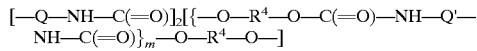

in which m=0 to 10,
$R^4$ is
a) a polycaprolactonediol radical,
b) a polytetrahydrofurfuryldiol radical or
c) a diol radical derived from a polyester diol characterized by a C:O ratio of >2.6, a C:H ratio of <10, and a molecular weight from 1000 to 20,000, or
d) a diol radical derived from a polyester-diol which is liquid at 20° C. and has a molecular weight of from 4000 to 10,000, measured with the aid of GPC (gel permeation chromatography), and R³ if n=3 is:

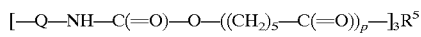

in which R⁵ is a triol radical of a linear or branched trivalent alcohol containing 3 to 6 carbon atoms and p is from 1 to 10, and Q and Q', independently of one another, are aromatic, aliphatic or cycloaliphatic groups which contain 6 to 18 carbon atoms and are derived from diisocyanates or mixtures of diisocyanates, and also B) one or more (meth)acrylate comonomers, wherein said composition comprises
  (a) 20–80% by weight of the polyurethane (meth) acrylate, and
  (b) 80–20% by weight of the (meth)acrylate comonomer, based on the overall amount of polymerizable compounds, and the activator system is a hydrazone activator system.

19. A method according to claim 18, wherein the composition comprises
  (a) 20–70% by weight of the polyurethane (meth)acrylate and
  (b) 80–30% by weight of the (meth)acrylate comonomer, based in each case on the overall amount of polymerizable compounds.

20. A method according to claim 18, wherein the (meth) acrylate comonomer (B) is selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzoyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert-butyl methacrylate, and tetrahydrofurfuryl methacrylate, or mixtures thereof, and also dimethacrylate.

21. A method according to claim 15, wherein the activator system comprises hydrazone compounds of the general formula (II)

(II)

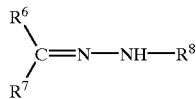

in which the radicals R⁶, R⁷ and R⁸ are at least partially identical or different and have the following meanings:

R⁶ is a straight-chain, branched or cyclic and optionally substituted alkyl radical or an optionally substituted aryl radical, R⁷ is hydrogen, a straight-chain, branched or cyclic and optionally substituted alkyl radical, or an optionally substituted aryl radical, or R⁶ and R⁷, together with the shared substituted carbon atom, to form a cycloaliphatic radical, which may also be substituted;

R⁸ is a straight-chain, branched or cyclic and optionally substituted alkyl radical or an optionally substituted aryl radical.

22. A method according to claim 21, wherein said activator system further comprises metal compounds at least partially soluble in the system, wherein said metals are selected from a group consisting of iron, copper, cobalt and manganese.

23. A method according to claim 7, said activator system further comprises co-components with reduction potential from redox systems which initiate free-radical polymerizations are used as accelerators.

24. A method according to claim 23, wherein the components of the activator system are used in the following concentrations by weight, based in each case on the overall mixture:
  (a) hydrazone compounds, from 0.1% to 7.5%,
  (b) metal compounds, from 50 ppm to 1%;
  (c) reducing agents, from 1 to 5%.

25. A method according to claim 23, wherein alpha-hydroxy ketones are used as reducing agents having an accelerator action.

26. A method according to claim 15 wherein the aerobically curable adhesive composition is applied as a spreadable surface coating, molding compound, or additive to inks, including printing inks.

27. A method according to claim 15 wherein the materials to be bonded are identical or different materials selected from metal, plastics, ceramic, glass and cellulosic materials.

28. A method according to claim 15 wherein the materials to be bonded comprise loudspeaker components.

* * * * *

UNITED STATES PATENT AND TRADEMARK OFFICE
CERTIFICATE OF CORRECTION

PATENT NO.     : 6,518,356 B1
DATED          : February 11, 2003
INVENTOR(S)    : Friese et al.

It is certified that error appears in the above-identified patent and that said Letters Patent is hereby corrected as shown below:

Column 11,
Line 50, delete "claim 7", and insert therefor -- claim 9 --.
Line 56, delete "(d)", and insert therefor -- (c) --.
Line 57, delete "claim 7", and insert therefor -- claim 9 --.

Signed and Sealed this

Twenty-ninth Day of July, 2003

JAMES E. ROGAN
*Director of the United States Patent and Trademark Office*